No. 891,259.
PATENTED JUNE 23, 1908.
A. W. HUTCHINS.
DEVICE FOR BENDING THE NECKS OF GLASS BLOWN DOSE MEASURING BOTTLES.
APPLICATION FILED JAN. 11, 1907.
FIG. 1.
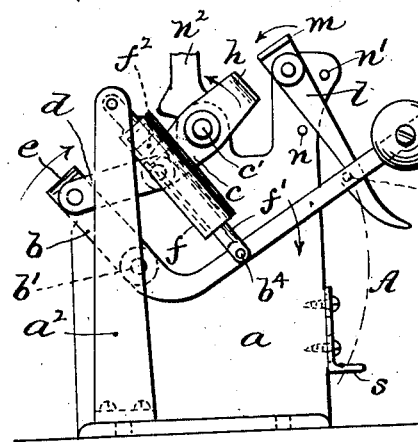
FIG. 2.
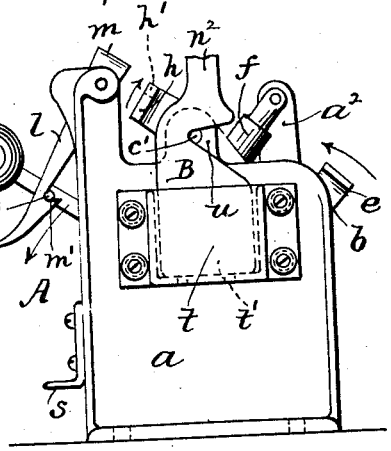
FIG. 3.
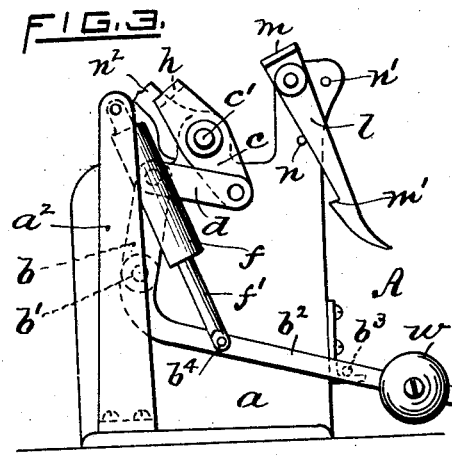
FIG. 4.
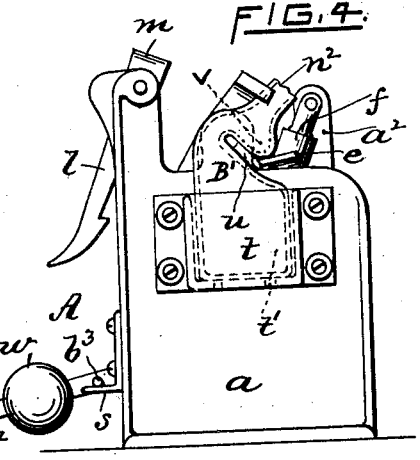
FIG. 5.
WITNESSES:
C. T. Hannigan
INVENTOR
Arthur W. Hutchins
By Geo. H. Remington
Atty.

UNITED STATES PATENT OFFICE.

ARTHUR W. HUTCHINS, OF PROVIDENCE, RHODE ISLAND.

DEVICE FOR BENDING THE NECKS OF GLASS-BLOWN DOSE-MEASURING BOTTLES.

No. 891,259.  Specification of Letters Patent.  Patented June 23, 1908.

Application filed January 11, 1907. Serial No. 351,757.

*To all whom it may concern:*

Be it known that I, ARTHUR W. HUTCHINS, a citizen of the United States of America, and a resident of Providence, in the county of Providence and State of Rhode Island, have invented certain new and useful Improvements in Devices for Bending the Necks of Glass-Blown Dose-Measuring Bottles, of which the following is a specification.

My invention relates to a new and novel device for reshaping or transforming glass-blown bottles; the invention being more especially adapted to be employed in the production of self-measuring dose-dispensing bottles. In bottles of this type, an example of which is illustrated and described in Law's U. S. patent, No. 570,759, the somewhat elongated neck portion is bent and disposed at an angle to the longitudinal axis of the body portion and provided with a dose-measuring recess or pocket, having a pre-determined capacity, on its under side for the retention of the liquid when the bottle is in the upright or normal position.

Bottles of the class referred to have not heretofore been successfully, economically and commercially produced owing to the practical difficulties experienced in blowing and molding them. That is to say, in blowing the glass to fill the bottle-mold wherein the neck is to be offset with relation to the body portion the thickness of the glass at the side nearest the neck is liable to be much greater than that of the opposite side, being the side farthest from the neck. Sometimes the glass-blower after shaping the body of the bottle manipulates the tube (with the plastic glass still attached to it) so as to produce bends in the neck, followed by severing the bottle from the tube. Such former methods of making dose-measuring bottles involves a very much greater amount of time and labor, the per centage of waste is greater and the product is not uniform in size, thickness and quality, as compared with the production of plain or common bottles.

In accordance with my invention the bottle, after being given its initial or semi-completed form in a separable mold in substantially the same manner and with a degree of rapidity and facility equal to that exercised in the production of a common bottle, is removed from the mold and, while the glass is still plastic, immediately placed in a device for bending the upper portion of the neck downwardly a pre-determined angular distance thereby at the same time depressing a part of it below the horizontal; said depressed part of the bottle when in use forming the measuring pocket or recess. The bottle is next removed from the device and reheated, finished and tempered in the usual manner.

In the accompanying sheet of drawings illustrating a device embodying my present invention, Figure 1 represents a front elevation of the same, the semi-completed bottle being in position preparatory to having its neck bent at an angle so as to form the measuring chamber. Fig. 2 represents a corresponding rear elevation. Fig. 3 is a view similar to Fig. 1, but showing the relative position of the parts after the neck has been acted upon. Fig. 4 represents a corresponding rear elevation, the bottle being still retained in the open cup or holder, and Fig. 5 is a top plan view, corresponding with Fig. 2, the bottle being omitted.

The device A embodying certain novel mechanical features of the invention may be described as follows:—

To the front of the frame $a$ is pivoted, at $b^1$, a bent or bell-crank lever having its lower portion $b^2$ provided with a pin $b^3$ and movable weight $w$, the upper arm $b$ of the lever being jointed to a link $d$, in turn jointed to the lower arm of a swinging lever $c$ pivoted at $c^1$ to the upper central part of the frame. The top or free end portion of lever $c$ is bent rearwardly to form a member $h$ having a suitably shaped or concave recess $h^1$ therein (Fig. 5) adapted to contact with the neck of the bottle B soon to be described. The upper end of said arm $b$ is also bent rearwardly and forms a flattened stop or gage $e$ arranged to limit the degree of bending movement imparted to the neck by said member $h$.

A self-dropping latch-lever $l$ is pivoted to the front of frame $a$, the lower portion thereof having its inner edge provided with a hook or seat $m^1$ arranged when coöperating with said pin $b^3$ to maintain the several swinging members in the normal inoperative position indicated in Figs. 1, 2 and 5. Fixed upper and lower pins, $n^1$ and $n$, serve to limit the angular movements of the latch-lever $l$.

To the back of the frame $a$ a cup or holder $t$ is adjustably secured; the form and size of the socket or chamber $t^1$ thereof permitting the body portion of the bottle to be readily placed therein, as clearly shown.

In order to prevent the weighted arm $b^2$ from falling too freely after being released from the latch $l$ I prefer to employ air cushioning means operatively connected with said arm. As drawn, the device consists of an inverted swinging tube or cylinder $f$ pivoted to the upper end of a fixed standard $a^2$ located in front of lever $b$. Within the cylinder is movably fitted a suitable piston $f^2$ (Fig.1) having a downwardly extending rod $f^1$ projecting through the lower end of the cylinder and jointed at $b^4$ to the weight carrying arm $b^2$. The function of the device is to check or control in a well-known manner the degree of speed of said arm in falling; the latter being finally arrested by the engagement of its pin $b^3$ with the stop $s$ adjustably secured to the frame.

In the drawings B, Fig. 2, designates one form of a partly completed dose-measuring bottle. The thus shaped bottle is blown in a separable mold substantially as usual, followed by removing it therefrom and placing it while still hot and pliable in the pocket $t^1$ of the holder $t$. It will be seen that the bottle has a U-shaped transverse indentation or gap $u$ formed at the junction of the neck and body portions, the free or stopper-carrying end $n^2$ of the neck being left vertical and unfinished, substantially as is usual in the manufacture of bottles before subjecting them to the final shaping and tempering operations.

The manner of operation of the device A for bending the necks of bottles is substantially as follows: Assuming first however that the several movable members $h$, $e$, $b^2$ and stop $s$ have been previously properly adjusted, positioned and timed with respect to one another and to the uncompleted bottle B—the mold-boy after opening the mold removes therefrom by the aid of tongs the still heated last blown bottle B and immediately places it in the cup $t$, as indicated in Figs. 1 and 2, at the same time striking the upper lateral extension $m$ of the latch $l$ thereby swinging it a short distance to release the operating lever $b^2$ which in falling swings the neck-bending member $h$ of lever $c$ in the arrow direction, its recess or groove $h^1$ meanwhile frictionally engaging and centralizing therein the cylindrical upper part $n^2$ of the neck of the bottle and gradually bends it and the adjacent lower portion downwardly the pre-determined angular distance thus practically closing the said gap $u$, the heated glass wall contiguous to the angle or bend yielding sufficiently for the purpose. I prefer to arrange the swinging member $e$ so that it will become automatically advanced and positioned at substantially the same time or slightly ahead of the moving neck and before the latter is brought to a state of rest, thereby forming a stop thereunder. The movements of the levers, &c., cease at the instant the pin $b^3$ of the member $b^2$ is arrested by the fixed stop $s$, thus insuring a uniform or invariable distance between the recess $h^1$ and the top of the movable member $e$ and also at the same time a corresponding uniformity in the bend and the measuring pocket $v$ of the bottle, all as clearly represented in Fig. 4. In the thus formed bottle, $B^1$, the neck is inclined at an angle of about 45°. The attendant next swings the weight-lever upwardly into engagement with the latch $l$ thereby returning the several movable members to the normal position, shown in Fig. 1, and removes the bottle from the cup, thus completing the operation. It may be added that the end portion $n^2$ of the neck of the removed bottle is subsequently reheated and provided with a lip, or finished as it is termed, and tempered in the usual manner.

By means of this invention it is obvious that the bottle B, after being placed in the cup, is adapted to be quickly converted into the transformed bottle $B^1$ in a practically automatic manner by simply releasing the weight-lever and then resetting it after completing its downward stroke.

Having thus described my invention what I claim as new and desire to secure by United States Letters Patent is:—

1. A device for bending dose-measuring bottles, the same consisting of a suitably mounted supporting member for holding the heated bottle while it is being acted upon, and means adapted to contact with the neck of the bottle and bend it at an angle so as to produce a completed measuring recess or pocket therein while still held in said supporting member.

2. In a device of the character hereinbefore described, the combination with a fixed holder for containing the bottle in a heated state, of a movable member arranged to contact with the neck of the bottle and bend it at an angle with respect to the body of the bottle so as to produce a recess in the neck, means for actuating said movable member, and a stop gage operatively connected with said actuating means for limiting the degree of bending movement of the neck.

3. In a device of the character hereinbefore described, the combination with a frame and an open cup or bottle-holder secured thereto of a swinging self-dropping operating lever pivoted to said frame, means for supporting the lever in the normal or elevated position, and suitably disposed swinging neck-bending and stop members arranged with respect to said holder connected with and having their movements controlled by said operating lever.

4. In a device of the character described, the combination with a suitably mounted open cup or bottle-holder, and swinging neck-bending and stop members arranged with respect to the holder, of a self-dropping lever operatively connected with and controlling the movements of said neck-bending and stop members, and a device connected with said lever for automatically regulating the speed of the latter during its downward movement.

Signed at Providence, R. I., this 31st day of December, 1906.

ARTHUR W. HUTCHINS.

Witnesses:
 GEO. H. REMINGTON,
 HENRY P. STONE.